United States Patent
Labasque et al.

(10) Patent No.: US 6,258,152 B1
(45) Date of Patent: Jul. 10, 2001

(54) PSA PROCESS USING AN AGGREGATED ADSORBENT CONSISTING OF A ZEOLITE PHASE AND A BINDER

(75) Inventors: Jacques Labasque, Versailles; Bernard Lledos, Guyancourt; Serge Moreau, Velizy Villacoublay, all of (FR)

(73) Assignee: L'Air Liquide, Societe Anonyme pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/379,348

(22) Filed: Aug. 23, 1999

(30) Foreign Application Priority Data

Aug. 21, 1998 (FR) .................................................. 98 10622

(51) Int. Cl.⁷ ................................................ B01D 53/047
(52) U.S. Cl. .................. 95/96; 95/102; 95/130; 95/902; 96/108
(58) Field of Search ........................ 95/96–98, 100–105, 95/130, 902; 96/108

(56) References Cited

U.S. PATENT DOCUMENTS

| | | | | |
|---|---|---|---|---|
| 4,859,217 | * | 8/1989 | Chao ........................................ | 95/130 |
| 5,152,813 | * | 10/1992 | Coe et al. ........................... | 95/130 X |
| 5,174,979 | | 12/1992 | Chao et al. .......................... | 423/715 |
| 5,258,058 | * | 11/1993 | Coe et al. ........................... | 95/130 X |
| 5,464,467 | * | 11/1995 | Fitch et al. .......................... | 95/130 X |
| 5,658,370 | * | 8/1997 | Vigor et al. ......................... | 95/130 X |
| 5,868,818 | * | 2/1999 | Ogawa et al. ...................... | 95/130 X |
| 5,922,107 | * | 7/1999 | Labasque et al. ................. | 95/130 X |
| 6,036,939 | * | 3/2000 | Funakoshi .......................... | 95/130 X |
| 6,053,966 | * | 4/2000 | Moreau et al. ..................... | 95/130 X |
| 6,068,678 | * | 5/2000 | Labasque et al. ................. | 95/130 X |

FOREIGN PATENT DOCUMENTS

| | | |
|---|---|---|
| 0 667 183 | 8/1995 | (EP) . |
| 0 685 430 | 12/1995 | (EP) . |
| 0 855 209 | 7/1998 | (EP) . |

* cited by examiner

*Primary Examiner*—Robert H. Spitzer
(74) *Attorney, Agent, or Firm*—Young & Thompson

(57) ABSTRACT

A PSA process for separating a gas flow, such as air, containing a first gas compound, such as nitrogen, which is adsorbed preferentially on an adsorbent, and a second gas compound, such as oxygen, which is adsorbed less preferentially on the adsorbent than the first gas compound. The adsorbent is formed by an aggregate comprising a zeolite phase and a binder, and contains elements Si, Al, Li, Na, Mg, K and Ca, the total proportions of these elements in the adsorbent being such that the Si/Al ratio is between 1 and 2.4, the Na/Li ratio is between 0.012 and 0.300, the Mg/Li ratio is between 0.012 and 0.400, the Ca/Li ratio is between 0.012 and 0.200, and the K/Li ratio is between 0.001 and 0.060.

13 Claims, No Drawings

PSA PROCESS USING AN AGGREGATED ADSORBENT CONSISTING OF A ZEOLITE PHASE AND A BINDER

FIELD OF THE INVENTION

The invention relates to a process of the PSA type, and more particularly the VSA type, for separation of a gas flow, in particular a gas flow containing essentially oxygen and nitrogen, such as air.

BACKGROUND OF THE INVENTION

The gases in air, such as in particular oxygen and nitrogen, are very important industrially. At present, one of the non-cryogenic techniques used for producing these gases is the technique referred to as PSA (pressure swing adsorption), which encompasses not only PSA processes proper, but also similar processes, such as the VSA (vacuum swing adsorption) or MPSA (mixed pressure swing adsorption) processes.

According to this PSA technique, when the gas mixture to be separated is air and the component to be recovered is oxygen, the oxygen is separated from the gas mixture using preferential adsorption of at least nitrogen on a material which preferentially adsorbs at least nitrogen and is subjected to cycles of given pressure in the separation zone.

The oxygen, which is adsorbed little or not at all, is recovered at the outlet of the separation zone; it has a purity, in general, greater than 90%, or even 93%.

More generally, a PSA process for the non-cryogenic separation of a gas mixture comprising a first compound which is adsorbed preferentially on an adsorbent material, and a second compound which is adsorbed less preferentially on the adsorbent material than the first compound, with a view to producing the second compound, cyclically comprises:

- a step of preferentially adsorbing at least the first compound on the adsorbent material, at an adsorption pressure referred to as the "high pressure", with recovery of at least some of the second compound produced in this way;
- a step of desorbing the first compound trapped in this way by the adsorbent, at a desorption pressure which is lower than the adsorption pressure and is referred to as the "low pressure";
- a step of recompressing the separation zone comprising the adsorbent, by progressively changing from the low pressure to the high pressure.

However, it is known that the separation efficiency for a gas mixture, such as air, depends on a number of parameters, in particular the high pressure, the low pressure, the type of adsorbent material used and its affinity for the compounds to be separated, the composition of the gas mixture to be separated, the adsorption temperature of the mixture to be separated, the size of the adsorbent particles, the composition of these particles and the temperature gradient set up inside the adsorbent bed.

At present, although it has not been possible to determine any general behaviour law, knowing that it is very difficult to connect these various parameters with one another, it is also known that the nature and the properties of the adsorbent have an essential role in the overall efficiency of the process.

Currently, zeolites are the adsorbents most widely used in PSA processes.

The zeolite particles customarily contain mono-, di- and/or trivalent metal cations, for example cations of alkaline metals, alkaline-earth metals, transition metals and/or lanthanides, incorporated during the synthesis of the zeolite particles and/or inserted subsequently by an ion-exchange technique, that is to say, in general, by bringing the unexchanged zeolite particles or raw zeolite into contact with a solution of one or more metal salts comprising the cation or cations to be incorporated into the zeolite structure, and subsequently recovering the particles of exchanged zeolite, that is to say zeolite containing a given quantity of metal cations. The proportion of metal cations introduced into the zeolite structure, relative to the total exchange capacity, is referred to as the exchange factor, which is between 0 and 100%.

Moreover, the adsorbents most widely used in processes of the PSA type for separating gases, in particular air, are zeolites, in particular of the X or LSX type, highly exchanged, in general to more than 80%, or even to more than 95%, with cations of very expensive metals, such as in particular lithium cations. Such zeolites are, in particular, described in documents EP-A-486384, EP-A-606848, EP-A-589391, EP-A-589406, EP-A-548755, US-A-5,268,023, EP-A-109063 and EP-A-760248.

However, the performance of the process, in particular the adsorption capacity or selectivity, and the overall production cost of the gas can vary considerably depending on the adsorbent employed in the PSA process.

SUMMARY OF THE INVENTION

The object of the present invention is therefore to provide a process for separating gases, in particular a PSA process for separating the gases in air, in employing an aggregated adsorbent comprising a zeolite phase and at least one binder which can lead to performance better than that of the processes using adsorbents of the prior art.

The present invention therefore relates to a PSA process for separating a gas flow containing at least one first gas compound which is adsorbed preferentially on at least one adsorbent, and at least one second gas compound which is adsorbed less preferentially on at least the adsorbent than the first gas compound, the adsorbent being formed by an aggregate comprising essentially a zeolite phase and at least one binder, characterized in that the adsorbent contains elements Si, Al, Li, Na, Mg, K and Ca, the total proportions of the elements in the adsorbent being such that:

the Si/Al ratio is between 1 and 2.4,
the Na/Li ratio is between 0.012 and 0.300,
the Mg/Li ratio is between 0.012 and 0.400,
the Ca/Li ratio is between 0.012 and 0.200,
and the K/Li ratio is between 0.001 and 0.060.

The proportion or percentage (%) of a given element is expressed relative to the total amount of elements Li, Na, Mg, Ca and K which are present in the aggregated adsorbent.

Depending on the case, the aggregated adsorbent of the invention may include one or more of the following characteristics:

The binder comprises a clay of the group formed by attapulgite, bentonite, kaolin or mixtures thereof, or a similar clay.

The Si/Al ratio is between 1.15 and 1.70.

The adsorbent contains a zeolite of the faujasite, preferably X or LSX (low silica X), type.

The Na/Li ratio is between 0.015 and 0.250, the Mg/Li ratio is between 0.037 and 0.327, the Ca/Li ratio is between 0.024 and 0.145 and/or the K/Li ratio is between 0.001 and 0.036.

The Na/Li ratio is between 0.018 and 0.230, the Mg/Li ratio is between 0.050 and 0.267, the Ca/Li ratio is between 0.038 and 0.100 and/or the K/Li ratio is between 0.001 and 0.025.

The adsorbent contains 50% to 85% of element Li, 1% to 25% of element Na, 1% to 20% of element Mg, 1% to 10% of element Ca and 0.1 to 3% of element K.

The adsorbent contains 55% to 82% of element Li, 2% to 20% of element Na, 3% to 18% of element Mg, 2% to 8% of element Ca and 0.1 to 2% of element K.

The adsorbent contains 60% to 81% of element Li, 2.5% to 15% of element Na, 4% to 16% of element Mg, 3% to 6% of element Ca and 0.1 to 1.5% of element K.

The proportion by mass of binder is at most 30% of the total mass of an adsorbent particle, preferably at most 25%.

The gas flow to be separated comprises nitrogen and at least one less polar compound, in particular oxygen and/or hydrogen and, preferably, the gas flow is air, the first gas compound being nitrogen and the second gas compound being oxygen. The air is, in the scope of the present invention, the air contained inside a building or a heated or unheated chamber, or the outside air, that is to say under atmospheric conditions, taken as such or optionally pre-treated.

The first gas compound is nitrogen and the second gas compound is oxygen; and an oxygen-rich gas flow is produced, that is to say one generally comprising 90% of oxygen.

It is of the VSA (vacuum swing adsorption), type.

The high pressure for adsorption is between $10^5$ Pa and $10^7$ Pa, preferably of the order of $10^5$ Pa to $10^6$ Pa, and/or the low pressure for desorption is between $10^4$ Pa and $10^6$ Pa, preferably of the order of $10^4$ Pa to $10^5$ Pa.

The feed temperature is between 10° C. and 80° C., preferably between 25° C. and 60° C.

The invention also relates to an aggregated adsorbent capable of being employed in a process mentioned above, characterized in that the aggregated adsorbent is in the form of an aggregate comprising essentially a zeolite phase and at least one binder, characterized in that the adsorbent contains elements Si, Al, Li, Na, Mg, K and Ca, the total proportions of the elements in the adsorbent being such that:

the Si/Al ratio is between 1 and 2.4, the Na/Li ratio is between 0.012 and 0.300, the Mg/Li ratio is between 0.012 and 0.400, the Ca/Li ratio is between 0.012 and 0.200, and the K/Li ratio is between 0.001 and 0.060.

The invention furthermore relates to a device capable of carrying out a PSA process, such as the process described above, comprising at least one adsorber and, preferably, from 1 to 3 adsorbers, in particular having radial geometry.

It should be noted that the present invention also applies to each of the adsorbers of a process employing several adsorbers, for example a multibed process.

DETAILED DESCRIPTION OF THE INVENTION

The invention will now be described in more detail with the aid of examples which are given by way of illustration but without implying any limitation.

EXMAPLES

Adsorbents A to G, consisting essentially of a zeolite phase and a binder, whose compositions in terms of elements lithium, sodium, magnesium, calcium and potassium are given in Table I below (the Si/Al ratio being about 1.72), are used as adsorbent in a VSA type process for separating the gases in air by adsorption in order to produce oxygen having a purity of about 93%.

The proportion of binder in adsorbents A to G is about 20% and the zeolite phase is of the X type.

TABLE I

| | Composition of the aggregated bead | | | | |
|---|---|---|---|---|---|
| Adsorbent n° | Li (in % by equivalents) | Na (in % by equivalents) | Mg (in % by equivalents) | Ca (in % by equivalents) | K (in % by equivalents) |
| A | 0.00 | 77.98 | 14.27 | 6.13 | 1.63 |
| B | 11.02 | 70.91 | 13.40 | 4.45 | 0.22 |
| C | 27.93 | 53.81 | 13.02 | 4.91 | 0.33 |
| D | 42.26 | 38.75 | 13.32 | 5.32 | 0.35 |
| E | 60.12 | 20.26 | 13.61 | 5.37 | 0.64 |
| F | 67.23 | 13.00 | 13.90 | 5.28 | 0.58 |
| G | 80.37 | 1.57 | 13.05 | 4.51 | 0.50 |

The percentages (%) are expressed relative to the total amount of elements Li, Na, Mg, Ca and K which are present in the adsorbent.

In these tests, the conditions under which the VSA process is implemented are as follows:

2 adsorbers operating in parallel adsorption pressure: $1.4 \times 10^5$ Pa desorption pressure: $0.4 \times 10^5$ Pa temperature of the feed air: 35° C. approximately.

Adsorbent: bed of zeolite A to G; adsorbents A to E do not fall within the scope of the invention, while adsorbents F and G are in accordance with the invention.

Production cycles: 2×40 seconds approximately.

The performance, that is to say the yield and productivity, of the VSA process which is obtained for adsorbents A to G tested is given in Table II in the form of indexed values (the reference being adsorbent A).

The yield (expressed in %) is defined as being the ratio of the amount of pure oxygen contained in the oxygen which is produced to the amount of pure oxygen introduced.

The productivity (expressed in $m^3$ (stp)/h/$m^3$ of adsorbent) is defined as being the ratio of the amount of pure oxygen contained in the oxygen which is produced to the amount (volume or mass) of adsorbent used for this production.

TABLE II

| Performance of the VSA process | | |
|---|---|---|
| Adsorbent n° | Yield | Productivity |
| A | 100.0 | 100.0 |
| B | id | id |
| C | id | id |
| D | id | id |
| E | 103.8 | 104.7 |
| F | 112.0 | 117.7 |
| G | 131.6 | 183.7 | id: results similar to adsorbent A.

The results obtained show that the best performance (yield and productivity) is obtained for the adsorbents according to the present invention, namely adsorbents F and G.

The present invention is not limited to the field of producing oxygen from air and may accordingly be applied to the separation of other gas flows, such as in particular flows containing hydrogen, carbon dioxide and/or carbon monoxide, in particular to the production of synthesis gas or "syngas".

What is claimed is:

1. A pressure swing adsorption process for separating a gas flow containing at least one first gas compound which is adsorbed preferentially on at least one adsorbent, and at least one second gas compound which is adsorbed less preferentially on at least said adsorbent than said first gas compound, said adsorbent being formed by an aggregate comprising essentially a zeolite phase and at least one binder, wherein said adsorbent contains elements Si, Al, Li, Na, Mg, K and Ca, the total proportions of said elements in said adsorbent being such that:

the Si/Al ratio is between 1 and 2.4;
the Na/Li ratio is between 0.012 and 0.300;
the Mg/Li ratio is between 0.012 and 0.400;
the Ca/Li ratio is between 0.012 and 0.200; and
the K/Li ratio is between 0.001 and 0.060.

2. The process according to claim 1, wherein the Si/Al ratio is between 1.15 and 1.70.

3. The process according to claim 1, wherein the zeolite phase comprises a faujasite zeolite.

4. The process according to claim 3, wherein the faujasite zeolite is an X or LSX zeolite.

5. The process according to claim 1, wherein the Na/Li ratio is between 0.015 and 0.250; the Mg/Li ratio is between 0.037 and 0.327; the Ca/Li ratio is between 0.024 and 0.145; and the K/Li ratio is between 0.001 and 0.036.

6. The process according to claim 1, wherein the adsorbent contains 50% to 85% of element Li; 1% to 25% of element Na; 1% to 20% of element Mg; 1% to 10% of element Ca; and 0.1% to 3% of element K.

7. The process according to claim 6, wherein the adsorbent contains 55% to 82% of element Li; 2% to 20% of element Na; 3% to 18% of element Mg; 2% to 8% of element Ca; and 0.1% to 2% of element K.

8. The process according to claim 1, wherein the proportion by mass of binder is at most 30% of the total mass of an adsorbent particle.

9. The process according to claim 8, wherein the proportion by mass of binder is at most 25% of the total mass of an adsorbent particle.

10. Process according to claim 1, wherein the process is a VSA process.

11. The process according to claim 1, wherein the gas flow to be separated comprises nitrogen and at least one less polar gas compound.

12. The process according to claim 11, wherein the gas flow to be separated is air, the first gas compound is nitrogen, and the second gas compound is oxygen.

13. An adsorbent in the form of an aggregate comprising essentially a zeolite phase and at least one binder, wherein said adsorbent contains elements Si, Al, Li, Na, Mg, K and Ca, the total proportions of said elements in said adsorbent being such that:

the Si/Al ratio is between 1 and 2.4;
the Na/Li ratio is between 0.012 and 0.300;
the Mg/Li ratio is between 0.012 and 0.400;
the Ca/Li ratio is between 0.012 and 0.200; and
the K/Li ratio is between 0.001 and 0.060.

* * * * *